(12) United States Patent
Jennings

(10) Patent No.: X9834
(45) Date of Patent: Jul. 1, 1836

(54) TURPENTINE, EXTRACTING BY STEAM

(76) Inventor: Isaiah Jennings

Isaiah Jennings
The Schedule referred to in these Letters Patent
and making part of the same containing a descrip-
tion in the words of the said Isaiah Jennings him-
self of his improvement in the process for the extract-
ing of spirits of turpentine and also of separating the
Rosin from pine wood.

To all to whom it may Concern.

Be it known that I Isaiah Jennings of the
the City of New York in the County of New York
have invented a new and improved process for extract-
ing spirits of turpentine and also for separating the rosin
from pine wood, and I do hereby declare that the
following is a full and exact description thereof.
I take the pine wood in logs or pieces and reduce
the same to powder or fine sawdust by means of
revolving saws or in any other way in which this
reduction can be effected and when I wish to separate
the spirit of turpentine alone therefrom I submit it
to the requisite degree of heat in a still of any construc-
tion adapted to the distillation of such spirits, put-
ting into the still, along with said powder such quan-
tity of water as may be requisite in the operation. The
residuum consisting of the ligneous portion and
the rosin will, when dried, be well adapted to the
purpose of making gas for the production of artificial light.
When I wish to obtain the rosin as well as the spirits of
turpentine, I put the wood, reduced to powder, into vats,
or other convenient vessels, and pour on it a sufficient
quantity of spirits of turpentine to separate, by dissolving,
the crude turpentine therefrom, keeping such vats or other
vessels covered to prevent evaporation, when the liquid
thus formed is drawn off, and distilled in the usual
way way a perfectly pure rosin will constitute the residuum in the still. The settlings in the vats are afterwards to be put into a still and the spirits driven off. What I claim as my invention in the within described process is the extracting of the spirits of turpentine or the spirits of turpentine and rosin from pine wood after reducing the wood into fine slender shreds or shavings in the manner or upon the principle herein set forth —

Witnesses
[illegible] B. W. R. Maxwell
[illegible] Wm. Cooper Jr.

Isaiah Jennings

[illegible]

(410 words)